(12) United States Patent
Mao

(10) Patent No.: US 9,871,762 B2
(45) Date of Patent: Jan. 16, 2018

(54) TRANSLATING NETWORK ADDRESS

(71) Applicant: Hangzhou H3C Technologies Co., Ltd., Hangzhou (CN)

(72) Inventor: Yu Mao, Beijing (CN)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 0 days.

(21) Appl. No.: 14/899,471

(22) PCT Filed: Aug. 27, 2014

(86) PCT No.: PCT/CN2014/085235
§ 371 (c)(1),
(2) Date: Dec. 17, 2015

(87) PCT Pub. No.: WO2015/027904
PCT Pub. Date: Mar. 5, 2015

(65) Prior Publication Data
US 2016/0182444 A1 Jun. 23, 2016

(30) Foreign Application Priority Data
Aug. 30, 2013 (CN) .......................... 2013 1 0390918

(51) Int. Cl.
*H04L 29/12* (2006.01)
*H04L 12/46* (2006.01)
*H04L 12/741* (2013.01)

(52) U.S. Cl.
CPC .......... *H04L 61/25* (2013.01); *H04L 12/4633* (2013.01); *H04L 12/4641* (2013.01);
(Continued)

(58) Field of Classification Search
None
See application file for complete search history.

(56) References Cited

U.S. PATENT DOCUMENTS 7,840,701 B2 11/2010 Hsu et al.
7,912,046 B2 3/2011 Li et al.
(Continued)

FOREIGN PATENT DOCUMENTS

CN 101488904 7/2009
CN 101707569 5/2010
(Continued)

OTHER PUBLICATIONS

J. Luciani, et al., "NBMA Next Hop Resolution Protocol (NHRP)", Network Working Group, Request for Comments: 2332, Category: Standards Track, Internet Engineering Task Force. Apr. 1998, pp. 1-52.
(Continued)

*Primary Examiner* — Edan Orgad
*Assistant Examiner* — Saumit Shah
(74) *Attorney, Agent, or Firm* — Hewlett Packard Enterprise Patent Department

(57) ABSTRACT

In a process of establishing a tunnel between a Hub device and a Spoke device, the Hub device in a DVPN obtains a public address and port information of a device in a public network after the public address and the port information are translated through a NAT device. The Hub device transmits the public address and the port information of the Spoke device to a server in the DVPN, so that another Spoke device obtains the public address and the port information to establish a direct tunnel with the Spoke device.

10 Claims, 4 Drawing Sheets

(52) U.S. Cl.
CPC .......... *H04L 45/74* (2013.01); *H04L 61/2514* (2013.01); *H04L 61/2557* (2013.01); *H04L 61/2517* (2013.01)

(56) References Cited

U.S. PATENT DOCUMENTS

| | | |
|---|---|---|
| 8,249,081 B2 | 8/2012 | Chang et al. |
| 2007/0033252 A1 | 2/2007 | Combest |
| 2007/0206597 A1* | 9/2007 | Asati .................. H04L 12/4633 370/392 |
| 2008/0201486 A1* | 8/2008 | Hsu ........................ H04L 29/06 709/238 |
| 2009/0097417 A1 | 4/2009 | Asati et al. |

FOREIGN PATENT DOCUMENTS

| | | |
|---|---|---|
| CN | 102546434 | 7/2012 |
| CN | 102594678 | 7/2012 |

OTHER PUBLICATIONS

"DMVPN Dynamic Tunnels Between Spokes Behind a NAT Device", Cisco Systems, Inc., Mar. 28, 2013.
"Dynamic Multipoint VPN", Cisco Systems, Inc. Mar. 28, 2013.
"Virtual Private Networks", Juniper Networks, Inc., vol. 5, Dec. 7, 2012.
International Search Report and Written Opinion dated Dec. 3, 2014, PCT Patent Application No. PCT/CN2014/085235 dated Aug. 27, 2014, State Intellectual Property Office of the P.R. China.

* cited by examiner

TRANSLATING NETWORK ADDRESS

CLAIM FOR PRIORITY

The present application is a national stage filing under 35 U.S.C 371 of PCT application number PCT/CN2014/085235, having an international filing date Aug. 27, 2014, which claims the benefit of priority from Chinese Patent Application No. 201310390918.7, having a filing date of Aug. 30, 2013, the disclosures of which are hereby incorporated by reference in their entireties.

BACKGROUND

Dynamic Virtual Private Network (DVPN) can collect, maintain and distribute information such as public network addresses through a next Hop Resolution Protocol (NHRP) or a Virtual Private Network (VPN) Address Management (VAM) protocol. In the DVPN, VPNs can be established among various branches in the condition that each branch uses a dynamic address to access a public network.

At present, in the DVPN, there is a request of implementing network address translation (NAT) in network communication. During a NAT process, an IP address in a packet head is translated into another IP address.

The NAT can be implemented through a dynamic way. For the dynamic way, an address mapping relationship of a private network and an external network is generated during a process of establishing a connection. In order to sufficiently use IP address resource and to implement that more host computers in the private network can access the external public network at the same time, a port address translation (PAT) mode is adopt for the dynamic way.

DETAILED DESCRIPTION

In order to make the object, technical solution and merits of the present invention clearer, the present invention will be illustrated in detail hereinafter with reference to the accompanying drawings and specific examples.

The DVPN may include VAM servers and VAM clients.

The VAM servers maintain information of all the VAM clients, respond registration and query from the VAM clients. The VAM servers may be respectively executed in routers or in dedicated servers.

The VAM clients register information of the VAM clients to the VAM servers, and initiate resolution requests to the servers when information of another DVPN node is needed. The VAM clients may be host computers or routers.

After registering to the VAM servers, the VAM clients may respectively have a Hub role or a Spoke role. The VAM clients playing the Hub role are usually center devices in a network, are taken as centers of transforming routing information, and are also taken as centers of forwarding data. In order to make description clear, the VAM clients with the Hub role are called as Hub devices. The VAM clients with the Spoke role are called as Spoke devices.

In the DVPN, when the public network is an IPv4 network, in order to solve a problem that there are not adequate IPv4 addresses, a Hub device or a Spoke device in the DVPN usually connects the public IPv4 network through a NAT device. When both Spoke devices respectively at two communication sides connect the public IPv4 network through the NAT device, a direct connection between the Spoke devices at two communication sides can be established. In order to distinguish different Spoke devices, the Spoke devices at two communication sides uniquely translate public network addresses of different Spokes into different outer network addresses. Different Spoke devices are respectively assigned with different outer network addresses. Thus, in a large-scale DVPN, outer network addresses assigned will be tight.

The method provided according to an example of the present disclosure includes procedures as follows.

Figure 1:
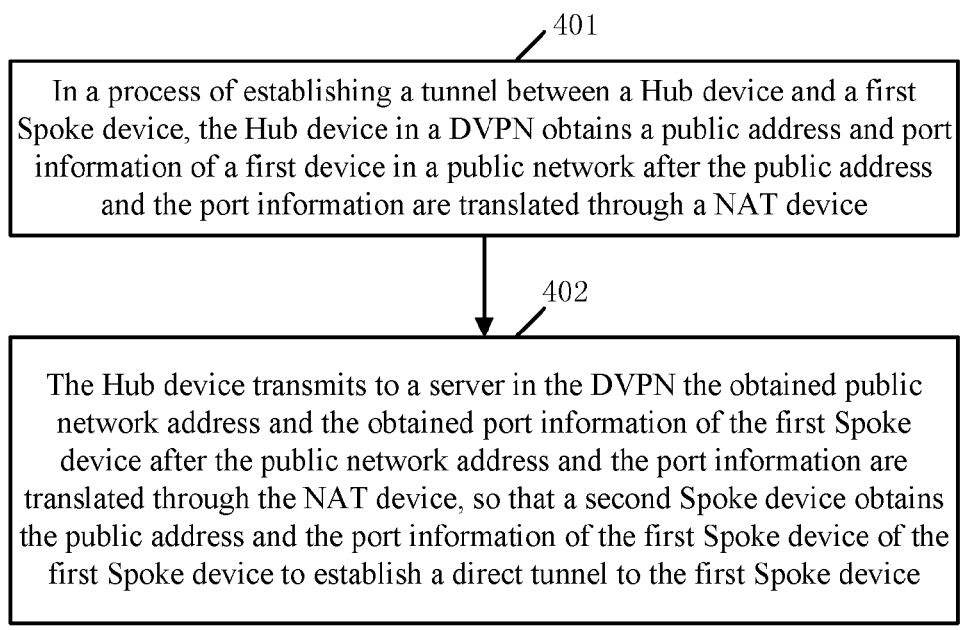
FIG. 1 is a flowchart illustrating a method for translating a network address according to an example of the present disclosure.

FIG. 1 is a flowchart illustrating a method according to an example of the present disclosure. The method applies to a DVPN. In the DVPN, there are Spoke devices and Hub devices. After registering to a VAM server, a VAM client obtains a Hub role or a Spoke role. The Spoke device is the VAM client as the Spoke role, and the Hub device is the VAM client as the Hub role.

Figure 2:
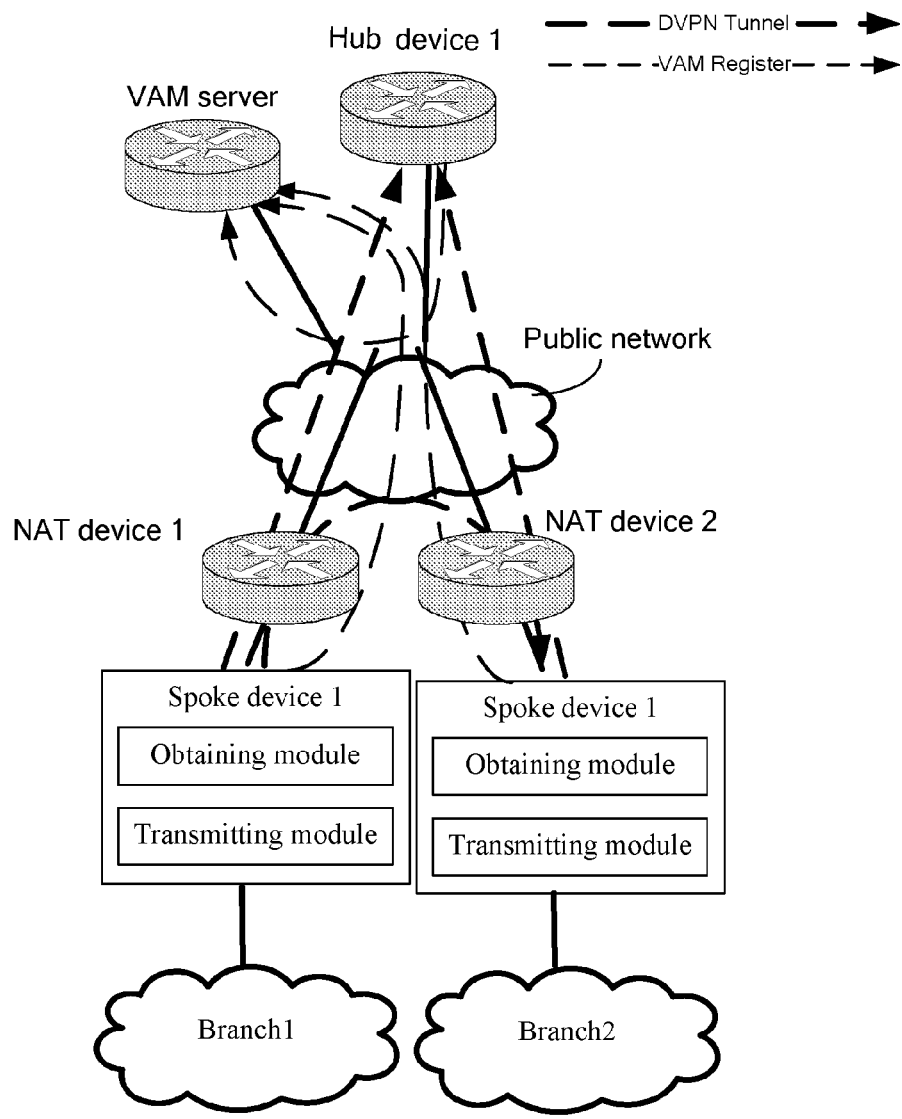
FIG. 2 is a schematic diagram illustrating a structure of a DVPN network according to an example of the present disclosure.

The DVPN as shown in FIG. 2 is taken as an example. In FIG. 2, after registering to the VAM server, a VAM client 1 and a VAM client 2 respectively obtain a Spoke role, and are respectively called as a Spoke device 1 and a Spoke device 2, and a VAM client 3 obtains the Hub role after registering to the VAM server and is called as the Hub device.

In the DVPN, there is a Spoke device connecting to a public network through a NAT device with a PAT mode. As shown in FIG. 2, a Spoke device 1 and a Spoke device 2 respectively connect to the public network through a NAT device 1 and a NAT device 2. In an example, the public network may be an IPV4 network.

For a Spoke device as shown in FIG. 2, the process provided in FIG. 1 may include procedures as follows.

At block 401, in a process of establishing a tunnel between a Hub device and a first Spoke device, the Hub device in a DVPN obtains a public address and port information of a first device in a public network after the public address and the port information are translated through a NAT device.

After registering to a VAM server and obtaining a Spoke role, a VAM client with the Spoke role establishes a tunnel with a VAM client with a Hub role.

In an example, the tunnel established between the Hub device and the first Spoke device may be an Internet Protocol Security (IPSec) or a DVPN User Datagram Protocol (UDP) tunnel.

In an example, the Hub device obtaining the public network address and the port information of the first Spoke device after the public network address and the port information is translated through the NAT device includes procedures as follows.

The Hub device obtains a packet transmitted from the first Spoke device during the process of establishing the tunnel between the Hub device and the first Spoke device.

The Hub device identifies whether a public network address carried in a packet head of the packet is the same with a public network address carried in the payload of the packet. When the public network address carried in the packet head of the packet is not the same with the public network address carried in the payload of the packet, the public network address and the port information carried in the packet head of the packet is determined as the public network address and the port information of the first Spoke device after the public network address and the port information are translated through the NAT device, obtains the public network address and the port information carried in the packet head of the packet.

At block 402, the Hub device transmits to a server in the DVPN the obtained public network address and the obtained port information of the first Spoke device after the public network address and the port information are translated through the NAT device, so that a second Spoke device obtains the public address and the port information of the first Spoke device of the first Spoke device to establish a direct tunnel to the first Spoke device.

In an example, at block 402, the second Spoke device obtaining the public network address and the port information of the first Spoke device after the public network address and the port information are translated through the NAT device includes procedures as follows.

When there is a data stream to be transmitted to from the second Spoke device to the first Spoke device, the second Spoke device transmits a request packet to the server.

The second Spoke device receives a response packet that corresponds to the request packet and is transmitted from the server. The response packet carries the public network address and the port information of the first Spoke device after the public network address and the port information are translated through the NAT device.

In an example, the server at block 402 may be a VAM server in the DVPN.

After obtaining the public network address and the port information of the first Spoke device after the public network address and the port information is translated through the NAT device, the second Spoke device establishes the direct tunnel with the first Spoke device.

It can be seen from the process as shown in FIG. 1 that, the NAT device in the DVPN adopts a PAT mode. In order to ensure that the Spoke device at a communication side obtains a port of the Spoke device at the other communication side after the port is translated through the NAT device, the Hub device dynamically obtains the public network address and the port information of the Spoke device after the public network address and the port information are translated through the NAT device in the process of establishing a tunnel between the Hub device and the Spoke device, and notifies the public network address and the port information to the server, e.g., the VAM server. Thus, one of Spoke devices at two communication sides can obtain a public network address and port information of the other of the Spoke devices at two communication sides through a query server, e.g., the VAM server to ensure that in the condition that the NAT device in the DVPN adopts a PAW mode, even though both Spoke devices at the two communication sides connect a public network through the NAT device, the Spoke devices at the two communication sides can perform communication according to the PAT mode adopted by the NAT device in the DVPN.

In an example as follows, through FIG. 3, a process as shown in FIG. 1 is described in the DVPN as shown in FIG. 2.

Figure 3:
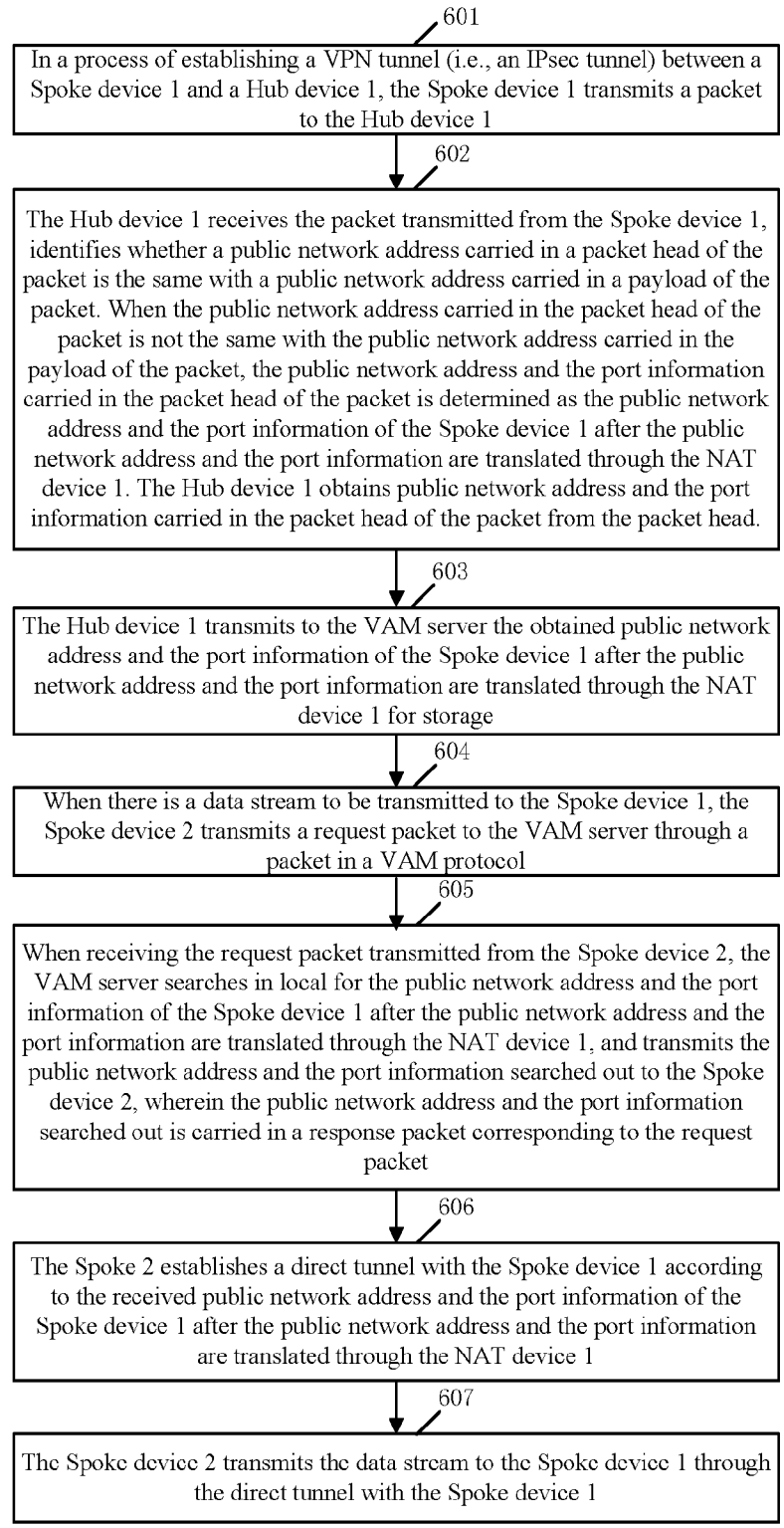
FIG. 3 is a flowchart illustrating a method for translating a network address according to an example of the present disclosure.

FIG. 3 is a flowchart illustrating a method according to an example of the present disclosure. As shown in FIG. 3, the process includes procedures as follows.

At block 601, in a process of establishing a VPN tunnel (i.e., an IPsec tunnel) between a Spoke device 1 and a Hub device 1, the Spoke device 1 transmits a packet to the Hub device 1.

In an example, the DVPN as shown in FIG. 2 is not limited to only include a Hub device. In order to make description convenience, there is a Hub device 1 in FIG. 2, and other Hub devices may be not illustrated in FIG. 2.

Furthermore, in an example, a packet transmitted by the Spoke device 1 may be a protocol packet, or a control packet.

At block 602, the Hub device 1 receives the packet transmitted from the Spoke device 1, identifies whether a public network address carried in a packet head of the packet is the same with a public network address carried in a payload of the packet. When the public network address carried in the packet head of the packet is not the same with the public network address carried in the payload of the packet, the public network address and the port information carried in the packet head of the packet is determined as the public network address and the port information of the Spoke device 1 after the public network address and the port information are translated through the NAT device 1. The Hub device 1 obtains public network address and the port information carried in the packet head of the packet from the packet head.

At block 603, the Hub device 1 transmits to the VAM server the obtained public network address and the port information of the Spoke device 1 after the public network address and the port information are translated through the NAT device 1 for storage.

At block 604, when there is a data stream to be transmitted to the Spoke device 1, the Spoke device 2 transmits a request packet to the VAM server through a packet in a VAM protocol.

The request packet may be a next hop resolve request packet in a VAM protocol.

At block 605, when receiving the request packet transmitted from the Spoke device 2, the VAM server searches in local for the public network address and the port information of the Spoke device 1 after the public network address and the port information are translated through the NAT device 1, and transmits the public network address and the port information searched out to the Spoke device 2, wherein the public network address and the port information searched out is carried in a response packet corresponding to the request packet.

The response packet may be a next hop resolve reply packet in the VAM protocol.

At block 606, the Spoke 2 establishes a direct tunnel with the Spoke device 1 according to the received public network address and the port information of the Spoke device 1 after the public network address and the port information are translated through the NAT device 1.

At block 607, the Spoke device 2 transmits the data stream to the Spoke device 1 through the direct tunnel with the Spoke device 1.

So far, the process as shown in FIG. 3 ends.

A method provided according to an example of the present disclosure is described above. An apparatus provided according to an example of the present disclosure is described as follows.

Figure 4:
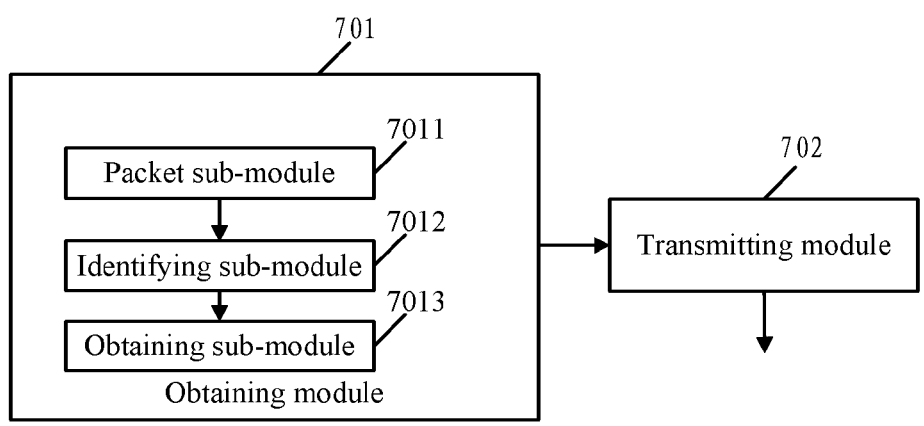
FIG. 4 is a schematic diagram illustrating an apparatus for translating a network address according to an example of the present disclosure.

FIG. 4 is a schematic diagram illustrating a structure of an apparatus according to an example of the present disclosure.

The apparatus applies to a NAT in a DVPN. There is at least one Spoke device in the DVPN. The Spoke device connects to a public network via a NAT device adopting a PAT mode. The apparatus as shown in FIG. 4 is a Hub device in the DVPN, which includes an obtaining module 701, a transmitting module 702. The modules may be implemented by hardware. The hardware may include hardware logic circuitry such as an application specific integrated chip (ASIC) or field programmable gate array (FPGA) or a general purpose processor such as a central processing unit (CPU) for executing instructions.

The obtaining module 701 is to obtain a public address and port information of a device in a public network after the public address and the port information is translated through a NAT device in a process of establishing a tunnel between the Hub device and the Spoke device.

The transmitting module 702 is to transmit the public address and the port information of the Spoke device obtained from the obtaining module 701 to a server in the DVPN, so that another Spoke device obtains the public address and the port information to establish a direct tunnel with the Spoke device.

In an example, the obtaining module includes a packet sub-module 7011, an identifying sub-module 7012 and an obtaining sub-module 7013.

The packet sub-module 7011 is to obtain a packet transmitted from the Spoke device in a process of establishing the tunnel between the Hub device and the Spoke device;

The identifying sub-module 7012 is to identify whether a public network address carried in a packet head of the packet is same with a public network address carried in a payload of the packet;

The obtaining sub-module 7013 is to when the public network address carried in the packet head of the packet is not same with the public network address carried in the payload of the packet, determining, by the Hub device, that the public network address and port information carried in the packet head is the public network address and the port information after the public address and the port information is translated through a NAT device, and obtaining the public network address and the port information carried in the packet head.

In an example, the tunnel established between the Hub device and the Spoke device comprises at least one of an Internet Protocol Security (IPSec) tunnel and a DVPN User Datagram Protocol (UDP) tunnel.

So far, the apparatus as shown in FIG. 4 ends.

Figure 5:
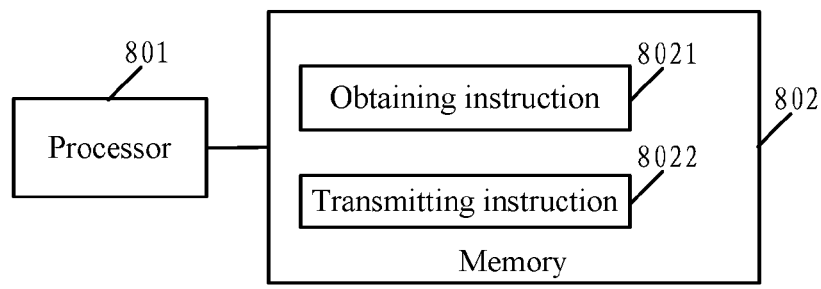
FIG. 5 is another schematic diagram illustrating an apparatus for translating a network address according to an example of the present disclosure.

FIG. 5 is a schematic diagram illustrating another apparatus according to an example of the present disclosure. As shown in FIG. 5, the apparatus includes a processor 801, a non-transitory machine readable storage medium such as memory 802. The processor 801 may execute machine readable instructions stored in the memory 802.

As shown in FIG. 8, the instructions include an obtaining instruction 8021 and a transmitting instruction 8022.

The obtaining instruction 8021 is obtain a public address and port information of a device in a public network after the public address and the port information is translated through a NAT device in a process of establishing a tunnel between the Hub device and the Spoke device.

The transmitting instruction 802 is to transmit the public address and the port information of the Spoke device to a server in the DVPN, so that another Spoke device obtains the public address and the port information to establish a direct tunnel with the Spoke device.

The processor 801 executes the obtaining instruction 8021, to obtain the public network address and port information of the Spoke device after the public network address and port information of the Spoke device is translated through the NAT device during a process of establishing a tunnel with the DVPN.

The processor 801 executes the transmitting instruction 8022, to transmit the public address and the port information of the Spoke device to a server in the DVPN, so that another Spoke device obtains the public address and the port information of the Spoke device after the public address and the port information is translated through the NAT device to establish a direct tunnel with the Spoke device.

In an example, the processor 801 executes the obtaining instruction 8021, to obtain a packet transmitted from the Spoke device in a process of establishing the tunnel between the Hub device and the Spoke device; to identify whether a public network address carried in a packet head of the packet is same with a public network address carried in a payload of the packet; when the public network address carried in the packet head of the packet is not same with the public network address carried in the payload of the packet, determining, by the Hub device, that the public network address and port information carried in the packet head is the public network address and the port information after the public address and the port information is translated through a NAT device, and obtaining the public network address and the port information carried in the packet head.

In an example, the tunnel may be an IPSec tunnel or a DVPN UDP tunnel.

So far, the apparatus as shown in FIG. 5 ends.

It can be seen from the above that, the NAT device in the DVPN adopts a PAW mode. In order to ensure that the Spoke device at a communication side obtains a port of the Spoke device at the other communication side after the port is translated through the NAT device, the Hub device dynamically obtains the public network address and the port information of the Spoke device after the public network address and the port information are translated through the NAT device in the process of establishing a tunnel between the Hub device and the Spoke device, and notifies the public network address and the port information to the server. Thus, one of Spoke devices at two communication sides can obtain a public network address and port information of the other of the Spoke devices at two communication sides through a query server to ensure that in the condition that the NAT device in the DVPN adopts a PAW mode, even though both Spoke devices at the two communication sides connect a public network through the NAT device, the Spoke devices at the two communication sides can perform communication according to the PAT mode adopted by the NAT device in the DVPN.

The foregoing is only preferred examples of the present invention and is not used to limit the protection scope of the present invention. Any modification, equivalent substitution and improvement without departing from the spirit and principle of the present invention are within the protection scope of the present invention.

What is claimed is:

1. A method for translating a network address, comprising:

obtaining, by a Hub device in a Dynamic Virtual Private Network (DVPN), a packet from a first Spoke device to establish a tunnel between the Hub device and the first Spoke device;

determining whether a public network address carried in a packet head of the packet is dissimilar to a public network address carried in a payload of the packet;

in response to determining that the public network address carried in the packet head of the packet is dissimilar to the public network address carried in the payload of the packet:
  obtain the public network address and port information carried in the packet head; and
  determine that the public network address and the port information carried in the packet head have been translated through a network address translation (NAT) device; and
based on the determination that the public network address and the port information have been translated through the NAT device, transmitting, by the Hub device, the public address and the port information of the first Spoke device to a server in the DVPN so a second Spoke device can establish a direct tunnel with the first Spoke device.

2. The method of claim 1, further comprising:
transmitting, by the second Spoke device, a request packet to the server when there are data stream to be transmitted from the second Spoke device to the first Spoke device;
receiving, by the second Spoke device, a response packet corresponding to the request packet, wherein the response packet carries the public address and the port information of the first Spoke device, the response packet is transmitted from the server, so that the second Spoke device uses the public address and the port information of the first Spoke device to establish the direct connection with the first Spoke device.

3. The method of claim 1, wherein the tunnel established between the Hub device and the first Spoke device comprises at least one of an Internet Protocol Security (IPSec) tunnel and a DVPN User Datagram Protocol (UDP) tunnel.

4. The method of claim 1, wherein the public network comprises an Ipv4 network.

5. An apparatus for translating a network address, comprising:
a memory comprising instructions; and
a processor to execute the instructions to:
  obtain a packet from a Spoke device to establish a tunnel between a Hub device and the Spoke device;
  determine whether a public network address carried in a packet head of the packet is dissimilar to a public network address carried in a payload of the packet;
  in response to a determination that the public network address carried in the packet head of the packet is dissimilar to the public network address carried in the payload of the packet:
    obtain the public network address and port information carried in the packet head; and
    determine that the public network address and the port information carried in the packet head have been translated through a network address translation (NAT) device; and
  based on the determination that the public network address and the port information have been translated through the NAT device, transmit the public address and the port information to a server in a Dynamic Virtual Private Network (DVPN) so another Spoke device is able to establish a direct tunnel with the first Spoke device.

6. The apparatus of claim 5, wherein the tunnel established between the Hub device and the Spoke device comprises at least one of an Internet Protocol Security (IPSec) tunnel and a DVPN User Datagram Protocol (UDP) tunnel.

7. The apparatus of claim 5, wherein the public network comprises an Ipv4 network.

8. A non-transitory machine readable storage medium comprising instructions that, when executed, cause a machine to at least:
  obtain a packet from a Spoke device to establish a tunnel between a Hub device and the Spoke device;
  determine whether a public network address carried in a packet head of the packet is dissimilar to a public network address carried in a payload of the packet;
  in response to a determination that the public network address carried in a packet head of the packet is dissimilar to the public network address carried in a payload of the packet:
    obtain the public network address and port information carried in the packet head; and
    determine that the public network address and the port information carried in the packet head have been translated through a network address translation (NAT) device; and
  based on the determination that the public network address and the port information have been translated through the NAT device, transmit the public address and the port information of the Spoke device to a server in a Dynamic Virtual Private Network (DVPN) so another Spoke device is able to establish a direct tunnel with the first Spoke device.

9. The non-transitory storage medium of claim 8, wherein the tunnel established between the Hub device and the Spoke device comprises at least one of an Internet Protocol Security (IPSec) tunnel and a DVPN User Datagram Protocol (UDP) tunnel.

10. The non-transitory storage medium of claim 8, wherein the public network comprises an Ipv4 network.

* * * * *